United States Patent
Xie

(10) Patent No.: US 9,815,705 B2
(45) Date of Patent: Nov. 14, 2017

(54) SYNTHESIS OF MOLECULAR SIEVE SSZ-98

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/415,983

(22) Filed: Jan. 26, 2017

(65) Prior Publication Data

US 2017/0291823 A1    Oct. 12, 2017

Related U.S. Application Data

(60) Provisional application No. 62/321,251, filed on Apr. 12, 2016.

(51) Int. Cl.
*C01B 39/30* (2006.01)
*B01J 29/50* (2006.01)

(52) U.S. Cl.
CPC ............. *C01B 39/305* (2013.01); *B01J 29/50* (2013.01)

(58) Field of Classification Search
CPC .................... C01B 39/305; B01J 29/50–29/64
See application file for complete search history.

(56) References Cited

U.S. PATENT DOCUMENTS

| | | | | |
|---|---|---|---|---|
| 3,947,482 A * | 3/1976 | Albers | ..................... | C01B 39/04 423/705 |
| 4,391,785 A * | 7/1983 | Rosinski | .............. | B01J 29/7034 423/332 |
| 8,409,546 B2 * | 4/2013 | Bull | ................... | B01D 53/9418 423/700 |
| 8,900,548 B2 * | 12/2014 | Burton | ..................... | B01J 29/70 423/706 |
| 9,409,786 B2 | 8/2016 | Xie et al. | | |
| 9,416,017 B2 | 8/2016 | Xie et al. | | |
| 9,550,684 B2 * | 1/2017 | Weston | ................... | C10G 50/00 |
| 2016/0001273 A1 | 1/2016 | Xie et al. | | |
| 2016/0375428 A1 | 12/2016 | Xie et al. | | |

* cited by examiner

*Primary Examiner* — David M Brunsman
(74) *Attorney, Agent, or Firm* — Terrence M. Flaherty

(57) ABSTRACT

A method is disclosed for synthesizing molecular sieve SSZ-98 using a structure directing agent selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations.

8 Claims, 2 Drawing Sheets

SYNTHESIS OF MOLECULAR SIEVE SSZ-98

TECHNICAL FIELD

This disclosure relates to a method of synthesizing molecular sieve SSZ-98 using a structure directing agent selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations.

BACKGROUND

Molecular sieve materials, both natural and synthetic, have been demonstrated in the past to be useful as adsorbents and to have catalytic properties for various types of organic conversion reactions. Certain molecular sieves, such as zeolites, aluminophosphates, and mesoporous materials, are ordered, porous crystalline materials having a definite crystalline structure as determined by X-ray diffraction. Within the crystalline molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

U.S. Pat. Nos. 9,409,786 and 9,416,017 disclose molecular sieve SSZ-98 and it synthesis using N,N'-dimethyl-1,4-diazabicyclo[2.2.2]octane dications as a structure directing agent. Molecular sieve SSZ-98 has the ERI framework topology.

According to the present disclosure, it has now been found that the cations described herein are effective as structure directing agents in the synthesis of molecular sieve SSZ-98.

SUMMARY

In one aspect, there is provided a method of synthesizing molecular sieve SSZ-98, the method comprising: (a) preparing a reaction mixture comprising: (1) a source of silicon oxide; (2) a source of aluminum oxide; (3) a source of a Group 1 or 2 metal; (4) a structure directing agent selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations; (5) hydroxide ions; and (6) water; and (b) subjecting the reaction mixture to crystallization conditions sufficient to form crystals of the molecular sieve.

In another aspect, there is provided an SSZ-98 molecular sieve comprising within its pores a structure directing agent selected from one or more of 1,1-diethylpyrrolidinium cations, 1-butyl-1-methylpiperidinium cations, 1,1-diethyl-4-methylpiperdinium cations, and 8-(pyridine-2-yl)-5,8-diazaspiro[4.5]decan-5-ium cations.

The molecular sieve has, in its as-synthesized and anhydrous form, a chemical composition comprising the molar relationship:

|  | Embodiment 1 | Embodiment 2 |
|---|---|---|
| $SiO_2/Al_2O_3$ | 10 to 50 | 10 to 20 |
| $Q/SiO_2$ | >0 to 0.2 | >0 to 0.1 |
| $M/SiO_2$ | >0 to 0.2 | >0 to 0.1 | wherein Q is a structure directing agent selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations; and M is Group 1 or 2 metal.

DETAILED DESCRIPTION

Introduction

Figure 1:
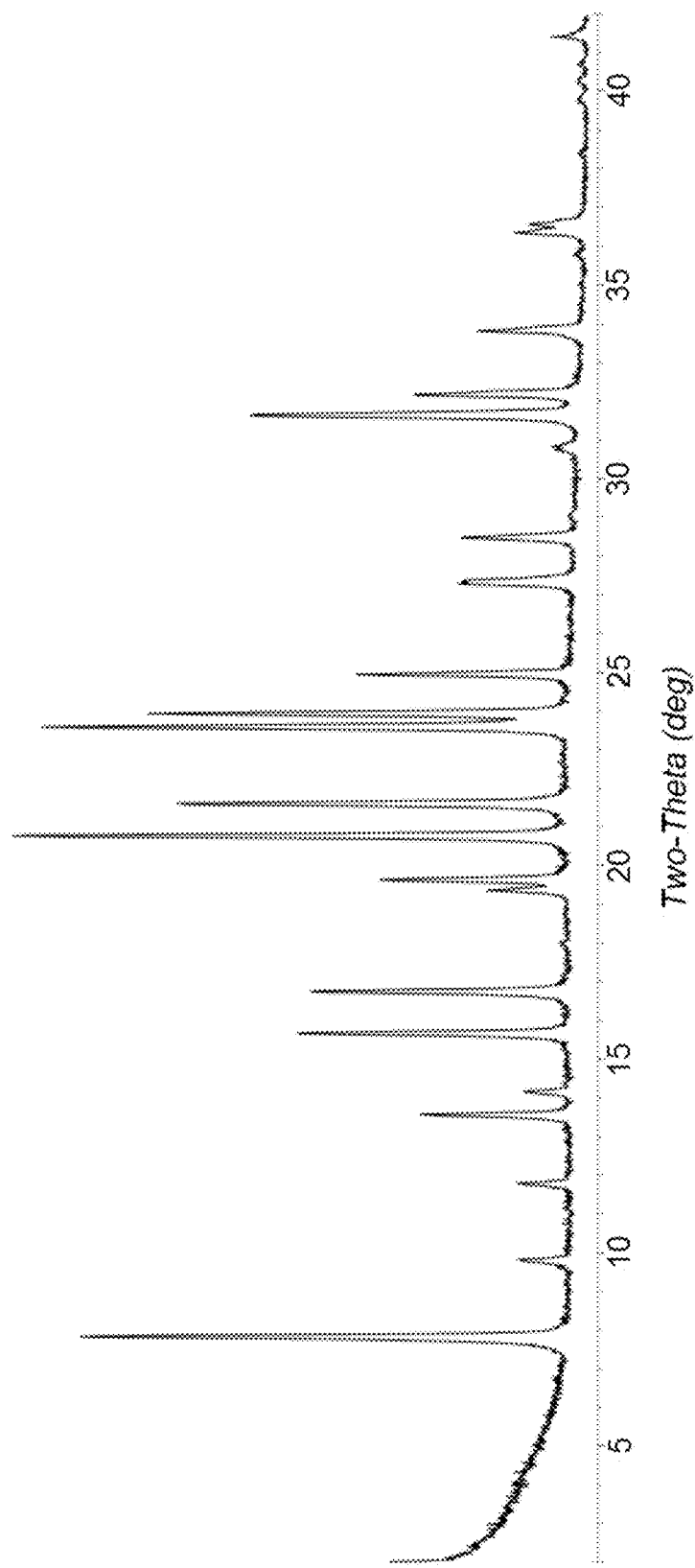
FIG. 1 is a powder X-ray diffraction (XRD) pattern of the as-synthesized molecular sieve prepared in Example 1.

The term "as-synthesized" is used herein to refer to a molecular sieve in its form after crystallization, prior to removal of the structure directing agent.

The term "anhydrous" is used herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Reaction Mixture

In general, molecular sieve SSZ-98 is prepared by: (a) preparing a reaction mixture comprising (1) a source of silicon oxide; (2) a source of aluminum oxide; (3) a source of a Group 1 or 2 metal (M); (4) a structure directing agent (Q) selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations; (5) hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants | Useful | Exemplary |
|---|---|---|
| $SiO_2/Al_2O_3$ | 10 to 100 | 15 to 80 |
| $M/SiO_2$ | 0.05 to 1.00 | 0.15 to 0.45 |
| $Q/SiO_2$ | 0.05 to 0.70 | 0.15 to 0.60 |
| $OH/SiO_2$ | 0.10 to 1.00 | 0.40 to 0.80 |
| $H_2O/SiO_2$ | 10 to 60 | 15 to 40 | wherein compositional variables M and Q are as described herein above.

Suitable sources of silicon oxide include fumed silica, colloidal silica, precipitated silica, alkali metal silicates, and tetraalkyl orthosilicates.

Suitable sources of aluminum oxide include hydrated alumina and water-soluble aluminum salts (e.g., aluminum nitrate).

Combined sources of silicon and aluminum can additionally or alternatively be used and can include aluminosilicate zeolites (e.g., zeolite Y).

Examples of suitable Group 1 or Group 2 metals (M) include sodium, potassium and calcium, with potassium being preferred. Suitable sources of Group 1 or 2 metal (M) include metal oxide, metal hydroxide, metal chloride, metal fluoride, metal sulfate, metal nitrate, and metal aluminate. The metal (M) is preferably present in the reaction mixture as the hydroxide.

The structure directing agent (Q) is selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations. The structure directing agents are represented by the following structures (1), (2), (3), and (4) below:

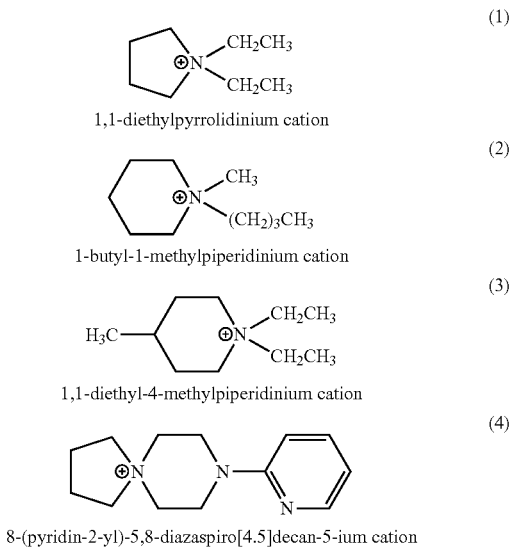

Suitable sources of Q are the hydroxides and/or salts of the relevant quaternary ammonium compounds.

The reaction mixture may also contain seeds of a molecular sieve material, such as SSZ-98, from a previous synthesis, desirably in an amount of from 0.01 to 10,000 ppm by weight (e.g., from 100 to 5000 ppm by weight) of the reaction mixture.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve disclosed herein can be carried out under either static, tumbled or stirred conditions in a suitable reactor vessel, such as for example polypropylene jars or Teflon-lined or stainless steel autoclaves, at a temperature of from 125° C. to 200° C. (e.g., from 130° C. to 175° C.) for a time sufficient for crystallization to occur at the temperature used, e.g., from 1 day to 28 days. Crystallization is usually carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

The as-synthesized SSZ-98 molecular sieve described herein may be subjected to subsequent treatment to remove part, or all, of the structure directing agent (Q) used in its synthesis. This is conveniently effected by thermal treatment in which the as-synthesized material is heated at a temperature of at least about 370° C. for at least 1 minute and generally not longer than 20 hours. While sub-atmospheric pressure can be employed for the thermal treatment, atmospheric pressure is desired for reasons of convenience. The thermal treatment can be performed at a temperature up to 925° C. Additionally or alternatively, the organic structure directing agent can be removed by treatment with ozone (see, e.g., A. N. Parikh et al., *Micropor. Mesopor. Mater.* 2004, 76, 17-22).

Extra-framework Group 1 or 2 metal cations in the present molecular sieve can be replaced in accordance with techniques well known in the art by ion exchange with other cations. Preferred replacing cations include metal ions (e.g., rare earth metals, metals of Groups 2 to 15 of the Periodic Table of Elements), hydrogen ions, hydrogen precursor ions (e.g., ammonium ions), and mixtures thereof.

Characterization of the Molecular Sieve

In its as-synthesized and anhydrous form, molecular sieve SSZ-98 prepared as described herein has chemical composition comprising the following molar relationship:

|  | Broad | Exemplary |
| --- | --- | --- |
| $SiO_2/Al_2O_3$ | 10 to 50 | 10 to 20 |
| $Q/SiO_2$ | >0 to 0.2 | >0 to 0.1 |
| $M/SiO_2$ | >0 to 0.2 | >0 to 0.1 | wherein Q and M are as described herein above.

It should be noted that the as-synthesized form of the molecular sieve disclosed herein may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught in U.S. Pat. No. 9,409,786, molecular sieve SSZ-98 is characterized by an X-ray diffraction pattern which, in the as-synthesized form of the molecular sieve, includes at least the peaks set forth in Table 2 below and which, in the calcined form of the molecular sieve, includes at least the peaks set forth in Table 3 below.

TABLE 2

Characteristic Peaks for As-Synthesized SSZ-98

| 2-Theta[a] | d-spacing (nm) | Relative Intensity[b] |
| --- | --- | --- |
| 7.78 | 1.136 | VS |
| 9.74 | 0.907 | W |
| 11.79 | 0.750 | W |
| 13.46 | 0.657 | S |
| 14.10 | 0.627 | W |
| 15.53 | 0.570 | M |
| 16.62 | 0.533 | W |
| 19.51 | 0.455 | W |
| 20.56 | 0.432 | VS |
| 21.40 | 0.415 | M |
| 23.38 | 0.380 | S |
| 23.76 | 0.374 | VS |
| 24.88 | 0.358 | W |

[a]±0.20
[b]The powder X-ray diffraction patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

TABLE 3

Characteristic Peaks for Calcined SSZ-98

| 2-Theta[a] | d-spacing (nm) | Relative Intensity[b] |
|---|---|---|
| 7.76 | 1.138 | VS |
| 9.78 | 0.904 | W |
| 11.79 | 0.750 | W |
| 13.45 | 0.658 | VS |
| 14.07 | 0.629 | W |
| 15.51 | 0.571 | W |
| 16.61 | 0.533 | W |
| 19.50 | 0.455 | W |
| 20.54 | 0.432 | S |
| 21.39 | 0.415 | W |
| 23.37 | 0.380 | M |
| 23.73 | 0.375 | S |
| 24.92 | 0.357 | W |

[a]±0.20
[b]The powder X-ray diffraction patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the molar ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

0.80 g of a 45% KOH solution, 11.06 g of a 20.2% 1-butyl-1-methylpiperidinium hydroxide solution and 2.00 g of CBV760 Y-zeolite (Zeolyst International, SiO$_2$/Al$_2$O$_3$ molar ratio=60) were mixed in a Teflon liner. The resulting gel was stirred until it became homogeneous. The liner was capped and placed within a Parr Steel autoclave reactor. The autoclave was then put in an oven heated at 150° C. for 3 days. The solid products were recovered from the cooled reactor by centrifugation, washed with deionized water and dried at 95° C.

Figure 2:
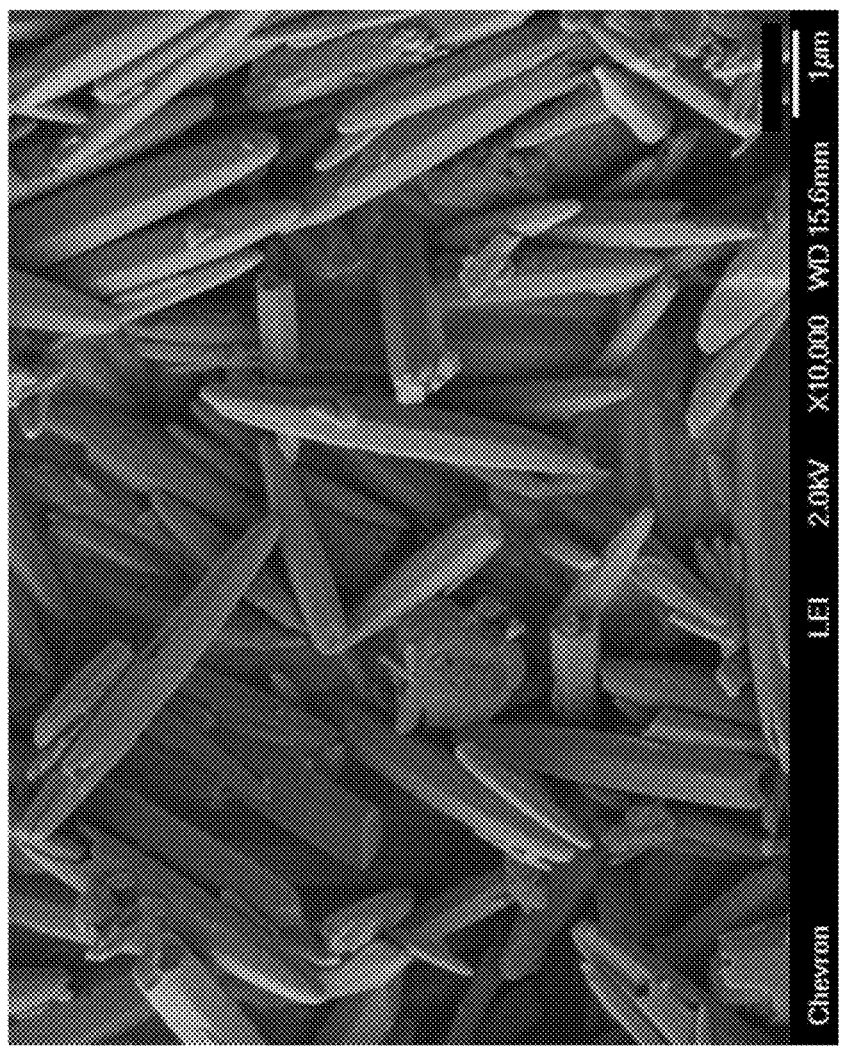
FIG. 2 is a Scanning Electron Micrograph (SEM) image of the as-synthesized molecular sieve prepared in Example 1.

The resulting molecular sieve product was analyzed by powder XRD and SEM. The powder X-ray diffraction shown in FIG. 1 indicates the material is pure SSZ-98. The SEM image shown in FIG. 2 indicates a uniform field of crystals.

The product had a SiO$_2$/Al$_2$O$_3$ molar ratio of 14.6, as determined by ICP elemental analysis.

Example 2

0.82 g of deionized water, 0.40 g of a 45% KOH solution, 4.15 g of a 20.2% 1-butyl-1-methylpiperidinium hydroxide solution and 1.00 g of CBV760 Y-zeolite (Zeolyst International, SiO$_2$/Al$_2$O$_3$ molar ratio=60) were mixed in a Teflon liner. The resulting gel was stirred until it became homogeneous. The liner was capped and placed within a Parr Steel autoclave reactor. The autoclave was then put in an oven heated at 135° C. for 4 days. The solid products were recovered from the cooled reactor by centrifugation, washed with deionized water and dried at 95° C.

The resulting molecular sieve product was identified by powder XRD and SEM to be pure SSZ-98.

The product had a SiO$_2$/Al$_2$O$_3$ molar ratio of 14.9, as determined by ICP elemental analysis.

Example 3

0.21 g of deionized water, 0.60 g of a 45% KOH solution, 14.04 g of a 20% 1,1-diethylpyrrolidinium hydroxide solution and 2.00 g of CBV760 Y-zeolite (Zeolyst International, SiO$_2$/Al$_2$O$_3$ molar ratio=60) were mixed in a Teflon liner. The resulting gel was stirred until it became homogeneous. The liner was capped and placed within a Parr Steel autoclave reactor. The autoclave was then put in an oven heated at 135° C. for 7 days. The solid products were recovered from the cooled reactor by centrifugation, washed with deionized water and dried at 95° C.

The resulting molecular sieve product was identified by powder XRD and SEM to be pure SSZ-98.

The product had a SiO$_2$/Al$_2$O$_3$ molar ratio of 13.7, as determined by ICP elemental analysis.

Example 4

5.55 g of deionized water, 0.40 g of a 45% KOH solution, 5.85 g of a 20% 1,1-diethylpyrrolidinium hydroxide solution and 1.00 g of CBV760 Y-zeolite (Zeolyst International, SiO$_2$/Al$_2$O$_3$ molar ratio=60) were mixed in a Teflon liner. The resulting gel was stirred until it became homogeneous. The liner was capped and placed within a Parr Steel autoclave reactor. The autoclave was then put in an oven heated at 135° C. for 7 days. The solid products were recovered from the cooled reactor by centrifugation, washed with deionized water and dried at 95° C.

The resulting molecular sieve product was identified by powder XRD and SEM to be pure SSZ-98.

The product had a SiO$_2$/Al$_2$O$_3$ molar ratio of 14.7, as determined by ICP elemental analysis.

Example 5

1.00 g of a 45% KOH solution, 14.04 g of a 20% 1,1-diethylpyrrolidinium hydroxide solution and 2.00 g of CBV780 Y-zeolite (Zeolyst International, SiO$_2$/Al$_2$O$_3$ molar ratio=80) were mixed in a Teflon liner. The resulting gel was stirred until it became homogeneous. The liner was capped and placed within a Parr Steel autoclave reactor. The autoclave was then put in an oven heated at 135° C. for 7 days. The solid products were recovered from the cooled reactor by centrifugation, washed with deionized water and dried at 95° C.

The resulting molecular sieve product was identified by powder XRD and SEM to be a mixture of SSZ-98 and CHA framework type zeolite.

Example 6

4.47 g of deionized water, 1.61 g of a 45% KOH solution, 4.19 g of a 20% 1,1-diethyl-4-methylpiperidinium hydroxide solution and 2.00 g of CBV760 Y-zeolite (Zeolyst International, $SiO_2/Al_2O_3$ molar ratio=60) were mixed in a Teflon liner. The resulting gel was stirred until it became homogeneous. The liner was capped and placed within a Parr Steel autoclave reactor. The autoclave was then put in an oven heated at 135° C. for 5 days. The solid products were recovered from the cooled reactor by centrifugation, washed with deionized water and dried at 95° C.

The resulting molecular sieve product was identified by powder XRD and SEM to be pure SSZ-98.

The product has $SiO_2/Al_2O_3$ molar ratio of 15.3, as determined by ICP elemental analysis.

Example 7

1.61 g of a 45% KOH solution, 8.91 g of a 17% 8-(pyridin-2-yl)-5,8-diazaspiro[4.5]decan-5-ium hydroxide solution and 2.00 g of CBV760 Y-zeolite (Zeolyst International, $SiO_2/Al_2O_3$ molar ratio=60) were mixed in a Teflon liner. The resulting gel was stirred until it became homogeneous. The liner was capped and placed within a Parr Steel autoclave reactor. The autoclave was then put in an oven heated at 135° C. for 5 days. The solid products were recovered from the cooled reactor by centrifugation, washed with deionized water and dried at 95° C.

The resulting molecular sieve product was identified by powder XRD and SEM to be pure SSZ-98.

The product had a $SiO_2/Al_2O_3$ molar ratio of 15.7, as determined by ICP elemental analysis.

Example 8

0.80 g of a 45% KOH solution, 4.45 g of a 17% 8-(pyridin-2-yl)-5,8-diazaspiro[4.5]decan-5-ium hydroxide solution and 2.00 g of CBV780 Y-zeolite (Zeolyst International, $SiO_2/Al_2O_3$ molar ratio=80) were mixed in a Teflon liner. The resulting gel was stirred until it became homogeneous. The liner was capped and placed within a Parr Steel autoclave reactor. The autoclave was then put in an oven heated at 135° C. for 5 days. The solid products were recovered from the cooled reactor by centrifugation, washed with deionized water and dried at 95° C.

The resulting molecular sieve product was identified by powder XRD and SEM to be pure SSZ-98.

The product had a $SiO_2/Al_2O_3$ molar ratio of 16.2, as determined by ICP elemental analysis.

Example 9

Calcination of SSZ-98

The as-synthesized molecular sieve product of Example 8 was calcined inside a muffle furnace under a flow of air heated to 540° C. at a rate of 1° C./minute and held at 540° C. for 5 hours, cooled and then analyzed by powder XRD. The powder XRD pattern indicated that the material remained stable after calcination to remove the organic structure directing agent.

Example 10

Micropore Volume Analysis

A calcined product of the as-synthesized SSZ-98 molecular sieve prepared in Example 4 was subjected to a micropore volume analysis using N2 as adsorbate and via the B.E.T. method. The molecular sieve exhibited a considerable void volume with a micropore volume of 0.24 cm$^3$/g.

The invention claimed is:

1. A method of synthesizing molecular sieve SSZ-98, comprising:
    (a) preparing a reaction mixture comprising:
        (1) a source of silicon oxide;
        (2) a source of aluminum oxide;
        (3) a source of a Group 1 or 2 metal (M);
        (4) a structure directing agent (Q) selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations;
        (5) hydroxide ions; and
        (6) water; and
    (b) subjecting the reaction mixture to crystallization conditions sufficient to form crystals of the molecular sieve.

2. The method of claim 1, wherein the reaction mixture comprises, in terms of molar ratios, the following:

| | |
|---|---|
| $SiO_2/Al_2O_3$ | 10 to 100 |
| $M/SiO_2$ | 0.05 to 1.00 |
| $Q/SiO_2$ | 0.05 to 0.70 |
| $OH/SiO_2$ | 0.10 to 1.00 |
| $H_2O/SiO_2$ | 10 to 60. |

3. The method of claim 1, wherein the reaction mixture comprises, in terms of molar ratios, the following:

| | |
|---|---|
| $SiO_2/Al_2O_3$ | 15 to 80 |
| $M/SiO_2$ | 0.15 to 0.45 |
| $Q/SiO_2$ | 0.15 to 0.60 |
| $OH/SiO_2$ | 0.40 to 0.80 |
| $H_2O/SiO_2$ | 15 to 40. |

4. The method of claim 1, wherein the Group 1 or 2 metal comprises potassium.

5. The method of claim 1, wherein the crystallization conditions include a temperature of from 125° C. to 200° C.

6. An SSZ-98 molecular sieve comprising within its pores a structure directing agent (Q) selected from one or more of 1,1-diethylpyrrolidinium cations, 1-butyl-1-methylpiperidinium cations, 1,1-diethyl-4-methylpiperidinium cations, and 8-(pyridin-2-yl)-5,8-diazaspiro[4.5]decan-5-ium cations.

7. The SSZ-98 molecular sieve of claim 6, and having, in its as-synthesized and anhydrous form, a composition comprising the molar relationship:

| | |
|---|---|
| $SiO_2/Al_2O_3$ | 10 to 50 |
| $M/SiO_2$ | >0 to 0.2 |
| $Q/SiO_2$ | >0 to 0.2 | where M is a Group 1 or 2 metal.

8. The SSZ-98 molecular sieve of claim 6, and having, in its as-synthesized and anhydrous form, a composition comprising the molar relationship:

| | |
|---|---|
| $SiO_2/Al_2O_3$ | 10 to 20 |
| $M/SiO_2$ | >0 to 0.1 |
| $Q/SiO_2$ | >0 to 0.1 | where M is a Group 1 or 2 metal.

* * * * *